March 14, 1961 K. SCHLESINGER 2,975,230

COLOR TELEVISION BEAM REGISTRATION SYSTEM

Filed Feb. 21, 1955 2 Sheets-Sheet 1

INVENTOR.

Kurt Schlesinger

BY Mueller & Aichele

Attys.

INVENTOR.
Kurt Schlesinger
BY Mueller & Aichele
Attys.

2,975,230
Patented Mar. 14, 1961

2,975,230

COLOR TELEVISION BEAM REGISTRATION SYSTEM

Kurt Schlesinger, La Grange, Ill., assignor to Motorola, Inc., Chicago, Ill., a corporation of Illinois Filed Feb. 21, 1955, Ser. No. 489,381

6 Claims. (Cl. 178—5.4)

This invention relates generally to color television systems, and more particularly to a system using a tube with a single gun with means for controlling the position of the beam from the gun with respect to phosphor portions producing different colors.

Color television systems in present use are of the three gun type wherein the beams from the three guns are arranged to strike phosphors of different colors to reproduce a color picture. Such tubes are quite expensive because of the gun structures and because of the precise mask required to insure that the beams strike the desired phosphors. Although the use of single gun tubes has been proposed, systems using such tubes have not been satisfactory because control of the position of the beam has not been satisfactory and/or very complex and sensitive equipment is required which is difficult to maintain in desired operating condition. In my prior copending application, Serial No. 198,117 filed November 29, 1950, now Patent No. 2,755,410, granted July 17, 1956 there is disclosed and claimed a color television system wherein the beam is guided along grid portions provided within the tube. The present application covers improvements and additional embodiments of the system disclosed in my prior application.

It is therefore an object of the present invention to provide an improved color television system in which a single electron beam is guided along phosphor strips producing different colors.

A further object of the invention is to provide a color television system using a one gun tube wherein the beam impinges on phosphor and tracking portions in a time division system so that the modulation of the beam has no effect on the tracking action.

A still further object is to provide a tracking arrangement for a color television system wherein the tracking portions are spaced from the phosphor portions so that there is no emission of light during the tracking action.

Another object of the invention is to provide a color television system having a tube with one gun and in which groups of phosphor strips producing different colors are positioned between tracking strips, and the beam is deflected across a group of phosphor strips and reaches the adjacent tracking strips by a sine wave sweep normal to a linear sweep along the strips.

A feature of the invention is the provision of a color television receiver using a tube of the single gun type having a grid formed by strips of material producing high secondary emission positioned between groups of phosphor strips, and means for deflecting the beam from the gun along the strips in an oscillatory manner cutting across the strips with the beam position being controlled by a feedback circuit using the secondary emission from the grid strips as the error signal.

Another feature of the invention is the provision of a color television receiver as specified above wherein the beam from the gun is gated so that signals representing the different color components of a television signal are applied thereto as the beam impinges phosphors of the corresponding colors, and a reference or tracking signal is applied when the beam impinges the secondary emission strips of the grid, with the secondary emission being utilized only when the reference signal is applied so that the control of the deflection is independent of the color components. The secondary emission strips are spaced from the phosphor strips so that the beam produces no light when the reference or tracking signal is applied. This permits the use of relatively large tracking signals to thereby provide better tracking control.

A further feature of the invention is the provision of a color television receiver as specified above which utilizes a color television signal including a color subcarrier wave and bursts of signal at the subcarrier frequency for controlling an oscillator in the receiver, wherein the beam is swept across the phosphor and tracking strips at one frequency, and tracking is provided at a frequency which is a subharmonic of the first frequency.

Further objects, features and attending advantages of the invention will be apparent from a consideration of the following description when taken in connection with accompanying drawings wherein.

In practicing the invention there is provided a color television system utilizing a tube having a single gun and a screen structure formed by a plurality of groups of horizontal strips of fluorescent or phosphor material, and a grid structure formed of horizontal strips of material providing efficient secondary emission interposed between the groups of phosphor strips. The beam from the gun is deflected along the color strips and is held in desired position with respect thereto by control means operating from the secondary emission signal from the grid strips. In order to eliminate the effect of modulation of the beam on the secondary emission tracking signal, the beam may be swept in an oscillating manner across a group of phosphor strips so that it impinges sequentially on the adjacent secondary emission strips and may be gated so that the various color signals are applied thereto when the beam impinges the phosphors producing corresponding colors and a reference signal is applied when the beam contacts the secondary emission grid strips. The secondary emission from the grid strips is utilized only when the reference signal is applied. The deflecting and tracking systems may be controlled in synchronism with the color information by controlling the same from the color subcarrier oscillator required for demodulating the color information of the standard color television signal. To provide better separation of the color modulating signals and the tracking signals, the oscillating sweep frequency may have a three to two relation with respect to the color subcarrier frequency such that each oscillation of sweep shows two colors and the next half cycle shows the third color. The tracking frequency may be made one-half the color subcarrier frequency, so that tracking is accomplished at one-third the frequency of the oscillating sweep. This provides a substantially equal time division between the three color signals and the tracking signals.

Figures 1, 2:
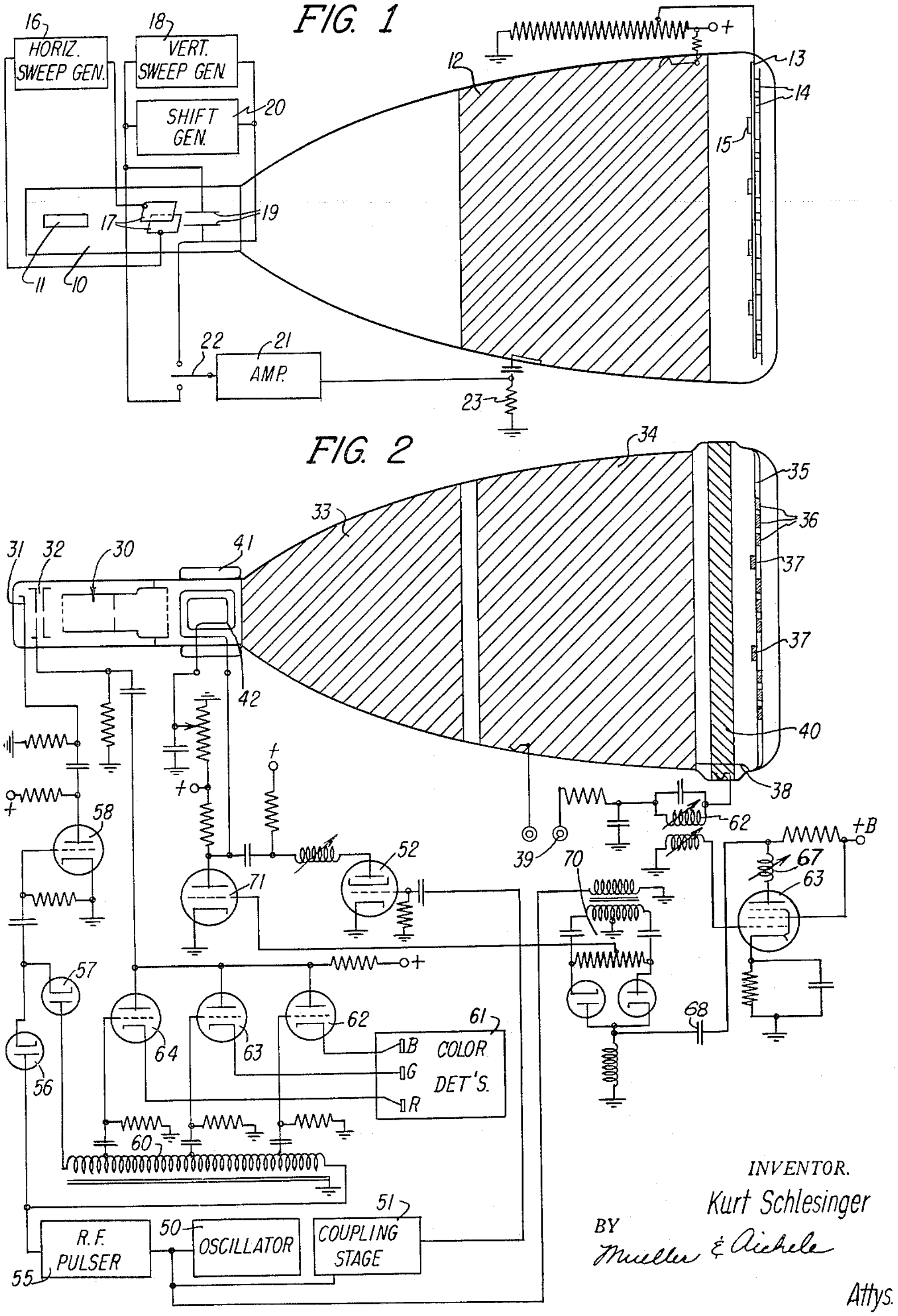
Fig. 1 illustrates a fundamental system in accordance with the invention.
Fig. 2 is a schematic diagram of an improved system in accordance with the invention.

Referring now to the drawings, in Fig. 1 there is shown schematically a cathode ray tube 10 including a gun 11 for emitting an electron stream. A screen structure is provided on the face of the tube including horizontal phosphor strips 14 which produce different colors when impinged by the electron beam. A sheet 13 of conducting material such as aluminum is provided on the back side of the strips. On the back side of the conducting sheet 13 there is deposited a grid structure formed by a plurality of strips 15 which are made of a material having different secondary emission characteristics than the sheet 13. As an example, these strips may be made of carbon black which produces less secondary emission than the conducting sheet. Alternatively, a material such as magnesium oxide may be used which has a secondary emission greater than that of aluminum.

The beam from the gun 11 is deflected across the screen by horizontal sweep generator 16 connected to horizontal deflecting plates 17 and by vertical sweep generator 18 connected to vertical deflection plates 19. A shift generator 20 is also connected to the vertical deflection plates so that desired shifts of the vertical position of the beam can be provided to cause the beam to ride on the desired color strip. The vertical position of the beam is further controlled by tracking amplifier 21 connected to the deflecting plates 19 through switch 22. This amplifier is controlled from the secondary emission produced within the tube and collected by the anode 12. This will appear across resistor 23 and the amplified signal is applied to one or the other of deflection plates 19 by switch 22. By changing the position of the switch 22 to selectively connect the amplifier 21 to the top and bottom electrodes 19, the beam can be made to ride on either the top or the bottom of the grid 15 to thereby selectively control the position of the beam.

In Fig. 2 there is shown a more complete system for controlling the position of the beam from a single electron gun with respect to a screen formed of phosphors producing three colors as required for reprodccing color pictures. The gun structure 30 includes a cathode 31 and a grid 32. High voltage for accelerating the beam is provided by an anode 33 and an ultor-anode 34. The screen is formed by groups of horizontal phosphor strips 36 on the tube face and a conducting sheet 35 on the back side of the strips. Between the groups of phosphor strips is the grid formed of secondary emission strips 37 which are of a material such as magnesium oxide which produces more secondary emission than the conducting plate which may be formed of aluminum. A connector 38 is provided for connecting the conducting sheet 35 to the ultor-anode 34, and placed between the conducting sheet and ultor-anode is a collector ring 40 for collecting the electrodes emitted from the strips 37. A potential is applied to the collector ring 40 at terminal 39 which is slightly higher than the potential applied to the ultor-anode 34.

Figure 3:
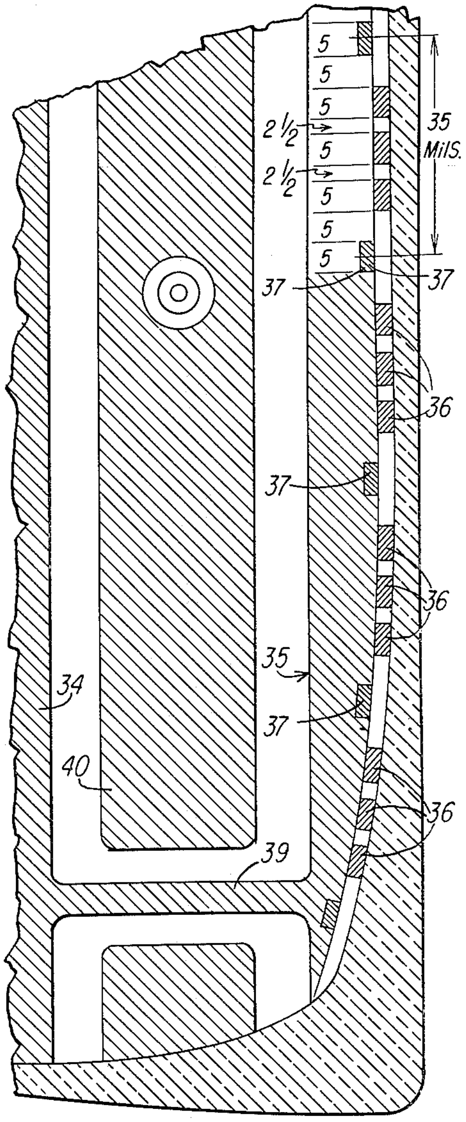
Fig. 3 is a detailed view of a portion of a tube of the system in Fig. 2.

Fig. 3 shows more in detail the construction of the screen structure. In this figure a graphite strip 39 provided in a gap in the collector ring 40 connects the anode 34 with the conducting sheet 35. It is to be pointed out that the size of the phosphor strips is exaggerated in both Figs. 2 and 3 and that 400 groups of phosphor strips are required. To do this in a tube having a face or screen 14 inches high, the width of each phosphor and grid strip is 5 mils. The spacing between adjacent phosphor strips is 2½ mils, and the spacing between adjacent phosphor and grid strips is 5 mils. The overall width of each group is then 35 mils.

Referring again to the system of Fig. 2, a deflection yoke 41 may be provided for producing the normal horizontal and vertical deflection of the beam, and an auxiliary deflection yoke 42 is provided for vernier vertical deflection as will be explained below. The vernier deflection is made up of two components, a wiping component of sine wave form which causes the beam to be swept across a group of phosphor strips and the adjacent tracking strips, and a correcting component controlled by the signal fed back from the secondary emission from the tracking grid. The frequency of the sine wave sweep must be fast enough to sample the color phosphor at a rate to utilize all the information provided by the color signal. The feedback circuit may provide adequate control by sampling the tracking strips at a lower rate than the sampling of the color phosphors. The sweep and tracking frequencies may be related to the color subcarrier frequency, but are not necessarily related.

Figures 4, 5:
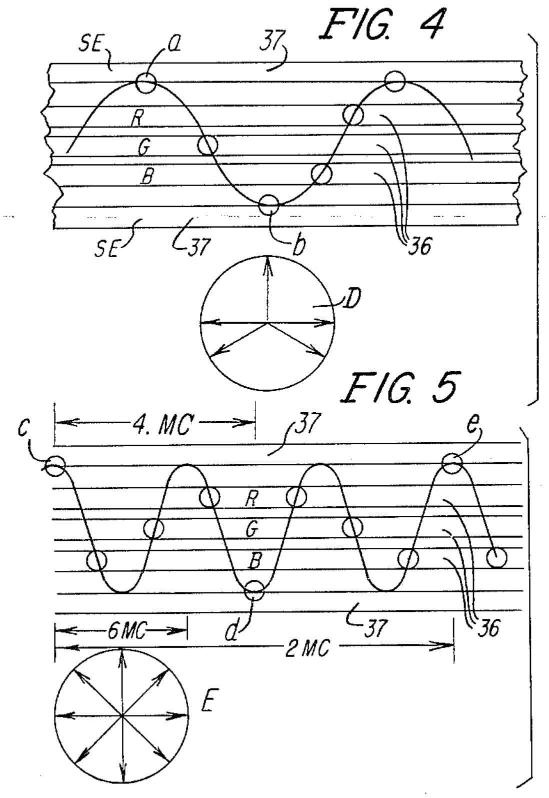
Figs. 4, 5 and 6 are curve charts illustrating operation of the system in accordance with the invention.

The system will be described first with the color television subcarrier or sampling frequency being used as the frequency of the sine wave oscillations which sweep the beam across the groups of phosphors, and also for the tracking action. In such a system the oscillator 50 will operate at the subcarrier frequency which is 3.58 mc., and may be the subcarrier frequency oscillator of the color television receiver. The output of the oscillator 50 is applied through coupling unit 51 to the output stage 52 which feeds the auxiliary or vernier vertical deflecting coils 42. This provides a small amplitude sine wave producing deflection of the beam as shown in Fig. 4. The beam wipes back and forth between the tracking strips 37, sweeping across the phosphor strips 36 which are designated R, G and B to indicate the colors red, green and blue which these strips produce.

The wave from the oscillator 50 is also applied to the pulser 55 which applies pulses to the delay line 60. The delay line 60 has a length equal to a half wave at the frequency of oscillator 50 so that pulses are applied to diodes 56 and 57 twice during each cycle. The diodes 56 and 57 control tracking tube 58 which renders the beam active at points *a* and *b* (Fig. 4) when the strips 37 are impinged thereby. The phasing must be arranged so that the tracking signals are applied to the beam at the two vertical extremes of the wiping action. The color signals derived by the color detector 61 of the receiver are applied through tubes 62, 63 and 64 to the grid 32 of the gun of the color tube. The tubes 62, 63 and 64 are provided to gate the signals from the delay line but this may not be necessary when wiping at the subcarrier frequency is provided.

Figure 6:
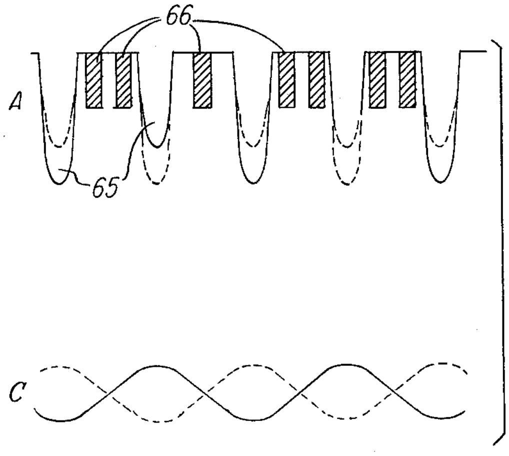

Signals indicating the postion of the beam with respect to the phosphor strips and the tracking grid are derived from secondary emission at the collector ring 40. These signals are applied through tuned circuit 62 to amplifier 63 which increases the small signal to a usable signal level. Since the tracking action does not produce illumination of the tube, large tracking signals can be used which increase the normally small secondary emission signals. The signal produced is shown in curve A of Fig. 6 with the peaks 65 in this curve resulting from secondary emission and the peaks 66 resulting from the noise of video modulation during display. It is to be noted that if the wiping wave is off center with respect to the two grids 37 at the edges of a color group the pulses on one side will be greater than on the other. Curve A shows by dotted lines the effect when the wiping wave becomes off center in the opposite direction. The output of the amplifier 63 is tuned by inductor 67 and condenser 68 which cooperates with the double tuned input circuit 62 to produce a smooth wave as shown in curve C of Fig. 6. The solid line shows the curve resulting from movement in one direction and the dotted line shows that a signal of opposite phase results from movement in the opposite direction.

The sine wave signal produced by the tuned amplifier is applied to the synchronous detector 70 to which the wave from the oscillator 50 is also applied. The detector produces a direct current output which is a measure of the amplitude and phase of the sine wave signal and can therefore be used to correct for errors in the position of the beam. This error signal is applied to amplifier 71 and added to the current in auxiliary or vernier coil 42 to change the vertical beam position, thus correcting for misregistration of the wiping wave with respect to the phosphor strips.

The system of Fig. 2 may also be used advantageously by utilizing different frequencies for the wiping and tracking actions. As previously stated these frequencies are not necessarily related to the frequency of the subcarrier oscillator of the receiver. In Fig. 5 there is illustrated a system in which the sine wave sweep frequency is 6 megacycles and the tracking action takes place at a frequency of 2 megacycles. The oscillator 50 therefore operates at 2 megacycles and the coupling unit 51 must be a frequency tripler so that the wiping wave has a frequency of 6 megacycles. Accordingly, the wiping wave of sinusoidal form is faster than in the system previously described. These high frequencies can be easily used because sine wave operation is provided.

Considering now the color reproduction in this system, as shown in Fig. 5 two colors will be sampled during each cycle of the wiping wave so that one and one half cycles are required to reproduce the three colors. This is illustrated in Fig. 5 wherein the blue phosphor is sampled during the first half of the first cycle and the green phosphor is sampled during the second half of the first cycle. During the second cycle, the red phosphor is sampled during the first half to provide sampling of all colors during each subcarrier cycle. The red phosphor is sampled again during the second half of the second cycle to start the next color group, the sequence of which is reversed in alternate color groups. Color sampling is, therefore, in effect at a 4 megacycle rate which provides all the detail provided in the 3.58 color subcarrier wave.

For tracking the signal, the error signal derived from the secondary emission collected by ring 40 and applied to the synchronous detector 70 is sampled at the low frequency produced by oscillator 50, the output of which is supplied as the decoding signal to the synchronous detector 70. Since the oscillator 50 operates at one-third the frequency of the wiping wave, sampling will be had at one-third the frequency as indicated by points *c*, *d* and *e* in Fig. 5. Although this gives less tracking information than the operation illustrated in Fig. 4, this is sufficient to hold the beam properly in position with respect to the phosphor strips.

The sampling of the color signals as illustrated in Fig. 5 is accomplished in the circuit of Fig. 2 by constructing the delay line 60 to have a length equal to one-half wave at the frequency of the oscillator 50, or one and a half wave lengths at the frequency of the multiplier 51. The color signals are gated by the tubes 62, 63 and 64 which are positioned along the delay line at well distributed positions. Although the distribution is not precisely uniform, the various intervals may be within the range from 42° to 48°, so that the spacing is generally of the same order. This wide spacing of the gating pulses, both for the color signals and for the tracking signals makes for a more reliable operation of the system since the various positions are much less critical. This is to be contrasted with the system in Fig. 4 in which the gating pulses for tracking are in very close relation with respect to the pulses for color reproduction and slight inaccuracies in the system might produce improper operation. The phase diagram designated D in Fig. 4 and the phase diagram designated E in Fig. 5 show the comparison of the two gating sequences.

The system just described can be operated at frequencies related to the color subcarrier frequency and this may eliminate objectionable beat frequencies. For example, the tracking frequency may be set at 1.79 mc. or one-half the color subcarrier frequency. Then the wiping frequency which is the third harmonic would be 5.37 mc. Instead of applying pulses to a delay line for the gating operation, sine waves can be used and the proper phases can be provided by tuned circuits. Sine to pulse shapers can be used to provide accurate gating of the various color signals.

It is therefore seen that a color television receiving system has been provided which includes a tube with a single gun and with a very simple screen structure formed by groups of phosphor lines on one side of a conductive sheet and a tracking grid formed on the other side, with the grid portions being parallel to and interspersed with the phosphor lines. The tube includes a collector ring for secondary emission. The entire tube structure including the gun and screen is very simple and can be produced inexpensively.

The system for operating the tube is also relatively inexpensive. As sine waves are used for the operation, production and control of the waves is easily accomplished. The tracking feedback circuit is highly accurate to provide precise control of the position of the beam with respect to the color phosphors. By using a lower tracking frequency, sufficient control is provided, and the gating of the beam for providing the color display and the tracking information is made much easier. This gating separates the color modulation and the tracking signals so that the tracking action is independent of the modulation and the tracking does not affect the display. These features combine to provide a highly effective system and one which is relatively simple and inexpensive.

I claim:

1. A system for displaying images in color including a tube having a viewing face and means within said tube for producing a beam of electrons which strikes said face, phosphor means including horizontal strip-like portions positioned on the inside of said face, a conductive sheet positioned on said phosphor means, said portions being arranged in groups with the portions in each group producing different predetermined colors, a grid structure deposited on said conductive sheet formed of material which produces more secondary emission than said conductive sheet, said grid structure including horizontal portions spaced between said groups of phosphor portions, a collector electrode adjacent said tube face for collecting secondary emission from said grid structure, means for deflecting said beam across said phosphor means producing horizontal deflection at a first frequency and vertical deflection at a second higher frequency providing oscillatory movement of said beam having an amplitude to sweep across a group of phosphor portions and the adjacent grid portions, gating means for applying signals to said beam producing means representing said predetermined colors in coincidence with movement of said beam across phosphor portions which produce the corresponding colors, said gating means including a portion applying reference signals to said beam producing means only at the times said beam impinges said horizontal grid portions when said beam is in proper registry therewith, and feedback means connected to said collector electrode and responsive to the secondary emission from said grid structure produced by said reference signals, said feedback means being coupled to said beam deflecting means to vary the vertical position of said beam with respect to said horizontal portions of said grid structure in accordance with the secondary emission therefrom.

2. A system for displaying images in color including a tube having a neck portion and a bulb portion with a viewing face, means within said neck portion for producing a beam of electrons directed toward said face, phosphor means on said viewing face including a plurality of horizontal strip-like portions positioned in the path of said beam, said portions being arranged in groups of three with the portion in each group producing different predetermined colors when impinged by said beam, a conductive sheet positioned on said phosphor means, a grid structure formed of material having different secondary emission properties than that of said conductive sheet deposited on said conductive sheet on the side thereof opposite said phosphor means, said grid structure including horizontal strip-like portions extending substantially parallel to said portions of said phosphor means and spaced between said groups thereof, an anode deposited on the inside of said bulb portion spaced from said viewing face, annular collector means deposited on the inside of said bulb portion and spaced from said anode and adjacent said conductive sheet for collecting secondary emission from said grid structure, said annular collector means being discontinuous and providing an open portion, conductor means deposited on said bulb portion and interconnecting said anode and said conductive sheet, said conductor means extending in said open portion of said collector means and insulated therefrom, deflecting means for said beam producing horizontal deflection at a first frequency along said portions and vertical deflection at a second higher frequency providing oscillatory movement of said beam having an amplitude to sweep across a group of phosphor portions and the adjacent grid portions, means for gating said beam producing means in coincidence with movement of said beam across said phosphor portions to produce desired colors and in coincidence with movement of said beam across said grid portions, means for applying reference signals to said beam producing means only at the times said beam impinges said horizontal strip like portions of said grid structure when said beam is in proper registry therewith, and feedback means connected to said collector electrode responsive to the secondary emission collected thereby from said reference signals to provide a control signal indicating the position of said beam with respect to said elongated portions of said grid, said feedback means including a portion controlling the operation of said beam deflecting means in accordance with said control signal to hold said beam in predetermined relation with respect to said grid structure.

3. A color television receiving system adapted to produce a color image in response to a video signal including a color subcarrier wave, said system including means for producing a beam of electrons, phosphor means including parallel strip-like portions positioned in the path of said beam, said portions being arranged in groups with each group including three portions producing different colors when impinged by said beam, a conductive sheet positioned in the path of said beam adjacent said phosphor means, a grid structure formed of material having different secondary emission properties than that of said conductive sheet, said grid structure including elongated portions extending substantially parallel to said portions of said phosphor means and spaced between said groups of phosphor portions, collector means for collecting the secondary emission from said conductive sheet and from said grid structure, deflecting means for said beam producing a component of deflection along said portions, an oscillator operating at one half the frequency of the color subcarrier wave, frequency multiplier means coupled to said oscillator for producing a wave having a frequency three times that of said oscillator, auxiliary deflecting means coupled to said frequency multiplier for providing oscillatory movement of said beam across said phosphor portions of one group and the adjacent grid portions, detector means for deriving color signals from the color subcarrier wave, gating means coupled to said oscillator including a delay line having a length equal to one half a wave length of the frequency of said oscillator and means for producing pulses from the oscillator wave and for applying the pulses to said delay line, said gating means including gate portions coupled to said delay line intermediate the ends thereof for applying said color signals to said beam producing means in coincidence with movement of said beam across said phosphor portions, said gating means including additional gating portions connected to said delay line at the ends thereof for applying reference signals to said beam producing means in coincidence with every third engagement of said beam with each grid portion, whereby said gating means applies signals to said beam producing means at substantially uniformly spaced intervals, and control means connected to said collector means for producing control signals from secondary emission collected thereby, said control means including detector means coupled to said oscillator for sampling said control signal in synchronization with the application of said reference signal to said beam producing means, said control means including means coupled to said auxiliary deflection means for controlling the deflection of said beam in accordance with the sampled control signals to hold said beam in predetermined position with respect to said grid structure.

4. A color television receiving system adapted to produce a color image in response to a video signal including a color subcarrier wave, said system including means for producing a beam of electrons, phosphor means including horizontal strip-like portions positioned in the path of said beam, said portions being arranged in groups with each group including three portions producing different colors when impinged by said beam, a conductive sheet positioned in the path of said beam adjacent said phosphor means, a grid structure formed of material having different secondary emission properties than that of said conductive sheet, said grid structure including elongated horizontal portions spaced between said groups of phosphor portions, collector means for collecting the secondary emission from said conductive sheet and from said grid structure, deflecting means for said beam producing horizontal deflection along said portions at a first frequency, an oscillator operating at a frequency substantially higher than said first frequency, frequency multiplier means coupled to said oscillator, auxiliary deflecting means coupled to said frequency multiplier for providing vertical movement of said beam across said phosphor portions of one group and the adjacent grid portions, gating means coupled to said oscillator including gate portions for applying color signals to said beam producing means in coincidence with engagement of said beam with said phosphor portions of corresponding colors, said gating means including additional gate portions for applying reference signals to said beam producing means during a part of the engagements of said beam with said grid portions, and feedback means connected to said collector means for producing control signals from secondary emission collected thereby, said feedback means including detector means coupled to said oscillator for sampling said control signals in synchronization with the application of said reference signal to said beam producing means, said feedback means including control means coupled to said auxiliary deflection means for controlling the vertical deflection of said beam in accordance with the sampled control signals to hold said beam in predetermined position with respect to said grid structure.

5. A color television receiving system adapted to produce a color image in response to a video signal including a color subcarrier wave, said system including means for producing a beam of electrons, phosphor means including horizontal strip-like portions positioned in the path of said beam, said portions being arranged in groups with each group including three portions producing different colors when impinged by said beam, a conductive sheet positioned in the path of said beam adjacent said phosphor means, a grid structure formed of material having different secondary emission properties than that of said conductive sheet, said grid structure including elongated horizontal portions spaced between said groups of phosphor portions, collector means for collecting the secondary emission from said conductive sheet and from said grid structure, deflecting means for said beam producing horizontal deflection along said portions at a first frequency, an oscillator operating at a frequency substantially higher than said first frequency, frequency multiplier means coupled to said oscillator, auxiliary deflecting means coupled to said frequency multiplier for providing sinusoidal vertical deflection of said beam across said phosphor portions of one group and the adjacent grid portions, gating means coupled to said oscillator including a delay line having a length equal to one half a wave length at the frequency of said oscillator and means for producing pulses from said oscillator wave and for applying said pulses to said delay line, said gating means including gate portions coupled to said delay line intermediate the ends thereof for applying color signals to said beam producing means in coincidence with engagement of said beam with said phosphor portions of corresponding colors, said gating means including additional gate portions connected to said delay line at the ends thereof for applying reference signals to said beam producing means during a part of the engagements of said beam with said grid portions, and feedback means connected to said collector means for producing control signals from secondary emission collected thereby, said feedback means including detector means coupled to said oscillator for sampling said control signals in synchronization with the application of said reference signal to said beam producing means, said feedback means including control means coupled to said auxiliary deflection means for controlling the deflection of said beam in accordance with the sampled control signals to hold said beam in predetermined position with respect to said grid structure.

6. A tube for displaying images in color including a neck portion and a bulb portion having a viewing face, means in said neck portion for producing a beam of electrons which impinges said face, phosphor means deposited on said viewing face including a plurality of horizontal strip-like portions positioned in the path of said beam, said strip-like portions having a width substantially equal to the diameter of said beam at said viewing face, said portions being arranged in groups of three with the portion in each group producing different complementary colors when impinged by said beam, a conductive sheet positioned on said phosphor means, a grid structure formed of material having greater secondary emission properties than that of said conductive sheet deposited on said conductive sheet on the side thereof opposite said phosphor means, said grid structure including elongated horizontal portions extending substantially parallel to said portions of said phosphor means and positioned between and spaced from said groups thereof, an anode deposited on the inside of said bulb portion spaced from said viewing face, a collector ring deposited on the inside of said bulb portion positioned between and spaced from said anode and said tube face for collecting secondary emission from said grid structure, said collector ring being discontinuous to form an open portion therein, and conductor means deposited on said bulb portion and interconnecting said anode and said conductive sheet, said conductor means forming a bridge extending in said open portion of said collector ring and spaced and insulated therefrom.

References Cited in the file of this patent

UNITED STATES PATENTS

| | | |
|---|---|---|
| 2,415,059 | Zworykin | Jan. 28, 1947 |
| 2,648,722 | Bradley | Aug. 11, 1953 |
| 2,667,534 | Creamer | Jan. 26, 1954 |
| 2,671,129 | Moore | Mar. 2, 1954 |
| 2,689,269 | Bradley | Sept. 14, 1954 |
| 2,700,700 | DeFrance | Jan. 25, 1955 |
| 2,744,952 | Lawrence | May 8, 1956 |
| 2,763,715 | Fromm | Sept. 18, 1956 |
| 2,771,503 | Schwartz | Nov. 20, 1956 |
| 2,773,118 | Moore | Dec. 4, 1956 |
| 2,791,626 | Hergenrother | May 7, 1957 |
| 2,792,522 | Welch | May 14, 1957 |
| 2,841,644 | Biggs | July 1, 1958 |